United States Patent [19]
Fernald et al.

[11] Patent Number: 5,394,488
[45] Date of Patent: Feb. 28, 1995

[54] OPTICAL FIBER GRATING BASED SENSOR

[75] Inventors: Mark R. Fernald, Enfield; Bruce D. Hockaday, Vernon, both of Conn.

[73] Assignee: United Technologies Corporation, Hartford, Conn.

[21] Appl. No.: 159,876

[22] Filed: Nov. 30, 1993

[51] Int. Cl.$^6$ ............................................. G02F 1/09
[52] U.S. Cl. ................................ 385/13; 250/227.18; 385/10
[58] Field of Search ................ 385/10, 12, 13, 15, 385/24, 27, 28, 29; 250/227.14, 227.17, 227.18, 227.19, 227.23, 227.24; 356/349–351

[56] References Cited

U.S. PATENT DOCUMENTS

| | | | |
|---|---|---|---|
| 4,442,350 | 4/1984 | Rashleigh | 250/227.17 |
| 4,516,021 | 5/1985 | Taylor | 250/227.17 |
| 4,627,728 | 12/1986 | Willson | 250/227.19 X |
| 4,761,073 | 8/1988 | Meltz et al. | 356/32 |
| 4,806,012 | 2/1989 | Meltz et al. | 356/32 |
| 5,144,690 | 9/1992 | Domash | 385/12 |

OTHER PUBLICATIONS

Report entitled "Characterization of Terfenol-D for Magnetostrictive Transducers" by Mark B. Moffett et al., J. Acoust. Soc. Am. 89 (3), Mar. 1991, pp. 1448–1455.

*Primary Examiner*—John D. Lee
*Attorney, Agent, or Firm*—Gerald L. DePardo

[57] ABSTRACT

An optical speed sensor includes a laser diode 10 that provides a broadband source light 12 to a coupler 18 which provides a source light 22 to a fiber Bragg grating 26 which reflects a first reflection wavelength of light 28 and passes the remainder as a light 30. The light 30 is incident on another fiber Bragg grating 32 which reflects a second reflection wavelength of light 34. The power of an output signal 40 is indicative of the reflected light beams 34,28, and is measured by a photodetector 46. The gratings 26,32 are mounted on a magnetostrictive material 60 which is connected to a permanent magnet 62 which is connected to a material 70 which conducts magnetic fields. The material 60 expands and contracts in response to the strength of magnetic fields therein. The reflection wavelengths for both gratings 26,32 are the same when the tooth 100 is not nearby, thereby causing the output signal 40 to be primarily equal to the reflected light 28. However, when the tooth 100 is nearby, the material 60 and the grating 32 expands causing the reflection wavelengths to separate, thereby causing the power of the output signal 40 to increase. Because both gratings 26,32 are on the same material thermal expansions will have no effect on the sensor measurement. Alternatively, one of the gratings 26,32 may be mounted to the material 70 or the magnet 62. The detection may performed in either reflection or transmission mode.

28 Claims, 7 Drawing Sheets

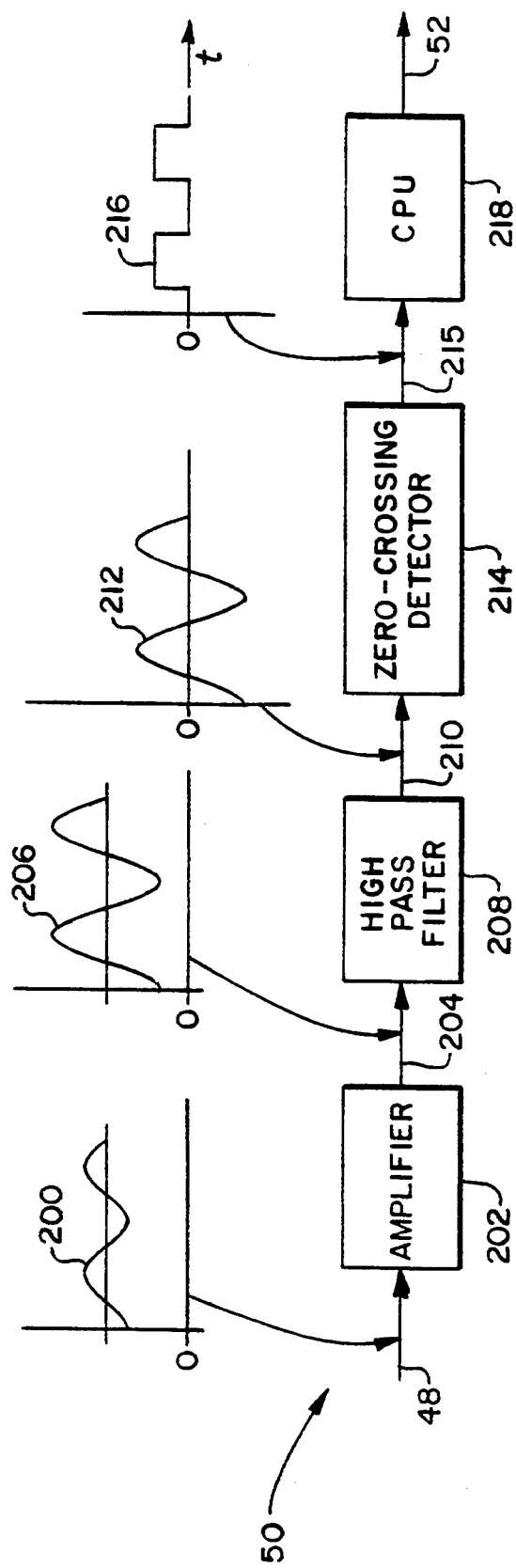

OPTICAL FIBER GRATING BASED SENSOR

TECHNICAL FIELD

This invention relates to speed sensors and more particularly to fiber optic speed sensors.

BACKGROUND ART

It is known in the field of optical speed sensors that optical fibers may be used to measure the rotational speed of gear teeth. Fiber optic sensing techniques, as is known, offer an advantage over conventional electrical sensors, e.g., magnetic pick-ups, by providing immunity to electromagnetic interference, reduced weight, and a wide signal bandwidth.

Prior art fiber optic techniques include intensity sensors, polarization modulation sensors, and Doppler sensing techniques.

Intensity type sensors provide a light beam on one side of a gear tooth and an optical detector on the opposite side of the gear tooth. When the tooth passes by the sensor, it blocks the light beam and causes the detection signal to drops out, thereby indicating the presence of gear tooth. This is also known as beam chopping. In that case, any contamination e.g., dirt, grease or particulate matter that collects on the beam source or detector may cause the system to become inoperable.

Polarization modulation sensors provide source light which exits an optical fiber and is incident on a collimating lens (e.g., a GRIN lens) which collimates the beam. The collimated beam passes through a polarizer. The polarized light passes through a clear rare-earth material, which is located near a permanent magnet or other source of magnetic field, and which alters the polarization of the polarized light in response to a change in magnetic fields therein. The light exits the rare-earth material and is reflected off of a mirror and back through the rare earth material, the polarizer, and the lens and onto a return fiber. As the gear tooth passes, the increased magnetic field strength through the rare-earth material alters the polarization, thereby reducing the power of the return light that passes through the polarizer.

With polarization sensors, however, because light exits the fiber (to be incident on bulk optics), precise alignment of the optical fibers with the optical elements is required. Also, this method is expensive and complex because uses polished rare earth garnets, coated GRIN rod lenses and polished fiber faces.

Doppler sensors provide source light incident partially tangentially on a rotating part and detect light back-scattered from the part. The frequency of the detected light is shifted from the source light in a known way that indicates the angular velocity of the part. To detect this frequency shift at a frequency detectable with electronics, FM modulation techniques are used at both the optical source, e.g., using an acousto-optic modulator or an integrated optic phase modulator, and in the detection circuitry, e.g., using standard frequency demodulation techniques.

However, to provide the needed feedback light the part must be coated with retro-reflective paint. Also, the speed calculation is dependent on the tangential angle with which the source light is incident on the target, thereby making use of a hand-held or tripod device prohibitive. Also, this technique requires complex, high-cost signal processing hardware and/or software. Further acousto-optic modulators can be bulky and have high power requirements, e.g., two watts, while integrated optic phase modulators are very expensive. Still further, as with the aforementioned intensity devices, the system is sensitive to any contamination which may collect on the shaft (thereby reducing adequate reflected light) or on the beam source and may cause the system to become inoperable.

Thus, it would be desirable to provide an optical speed sensor which overcomes the drawbacks of the prior art.

DISCLOSURE OF INVENTION

Objects of the invention include the provision of a fiber optic speed sensor, which is low cost, low power, easy to produce, is not susceptible to contamination, and may be hand-held.

According to a first aspect of the present invention an optical sensor includes a magnetostrictive material which expands and contracts based on the strength of magnetic fields therein; magnetic field means are connected to a portion of the magnetostrictive material for providing such magnetic fields within the magnetostrictive material; an optical waveguide is provided that guides light; first reflection means are disposed along the waveguide in the path of the source light, for providing a first reflected light at a first reflection wavelength, and for providing a first transmitted light; second reflection means are disposed along the waveguide in the path of the first transmitted light from the first reflection means, for providing a second reflected light at a second reflection wavelength and for providing a second transmitted light; light from said first and the second reflection means make up an output light signal; the first and second reflection means are mechanically connected to the magnetostrictive material and are oriented non-parallel to each other; the magnetostrictive material and the magnetic field means are oriented so as to cause the strength of the magnetic field in the magnetostrictive material to increase while a metallic object is nearby, thereby causing a dimension of the magnetostrictive material to increase and causing one of the reflection means to be stretched; and the first and the second reflection wavelength are substantially equal to each other while the metallic object is not nearby and are unequal while the metallic object is nearby, thereby causing the magnitude of the output light signal to change while the metallic object is nearby.

According further to the first aspect of the invention, the first and the second reflection wavelengths change in substantially the same way due to temperature variations of the magnetostrictive material. According still further to the first aspect of the invention, the first and second reflection means are oriented substantially perpendicular to each other.

According to a second aspect of the present invention an optical sensor includes a magnetostrictive material which expands and contracts based on the strength of magnetic fields therein; magnetic field means are connected to a portion of the magnetostrictive material for providing the magnetic fields within the magnetostrictive material; a non-magnetostrictive material is connected to a portion of the magnetic field means; an optical waveguide is provided which guides light; first reflection means are disposed along the waveguide in the path of the source light, for providing a first reflected light having the first reflection wavelength, and for providing a first transmitted light; second reflection means are disposed along the waveguide in the path of the first transmitted light from the first reflection means, for providing a second reflected light at a second reflection wavelength and for providing a second transmitted light; light from the first and the second reflection means make up an output light signal; one of the reflection means is mechanically connected to the magnetostrictive material and the other of the reflection means is mechanically connected to the non-magnetostrictive material; the magnetostrictive material and the magnetic field means are oriented so as to cause the strength of the magnetic field in the magnetostrictive material to increase while a metallic object is nearby, thereby causing a dimension of the magnetostrictive material to increase and causing the reflection means mechanically connected thereto to be stretched; and the first and the second reflection wavelengths are substantially equal to each other while the metallic object is not nearby and are unequal while the metallic object is nearby, thereby causing the magnitude of the output light signal to change while the metallic object is nearby.

According further to the present invention, the first and the second reflection wavelength change in substantially the same way due to temperature variations of the magnetostrictive material and the non-magnetostrictive material.

According further to the first and second aspects of the present invention, the reflection means are Bragg gratings and the waveguide is an optical fiber.

The invention represents a significant improvement over the prior art techniques of fiber optic sensing by not sensing the intensity or frequency of a transmitted or reflected source light, thereby avoiding problems with contamination. The invention is extremely simple in that it merely detects a shift in intensity level caused by the change in reflection wavelength of Bragg gratings due to a change in magnetic fields. Also, the invention does not require alignment of optical fibers and bulk optics. Further, the invention does not require acousto-optic modulators or integrated phase modulators. Also, no light is incident on moving parts so contamination cannot effect the performance.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 5 is a schematic block diagram of a speed circuit, in accordance with the present invention.

BEST MODE FOR CARRYING OUT THE INVENTION

Figure 1:
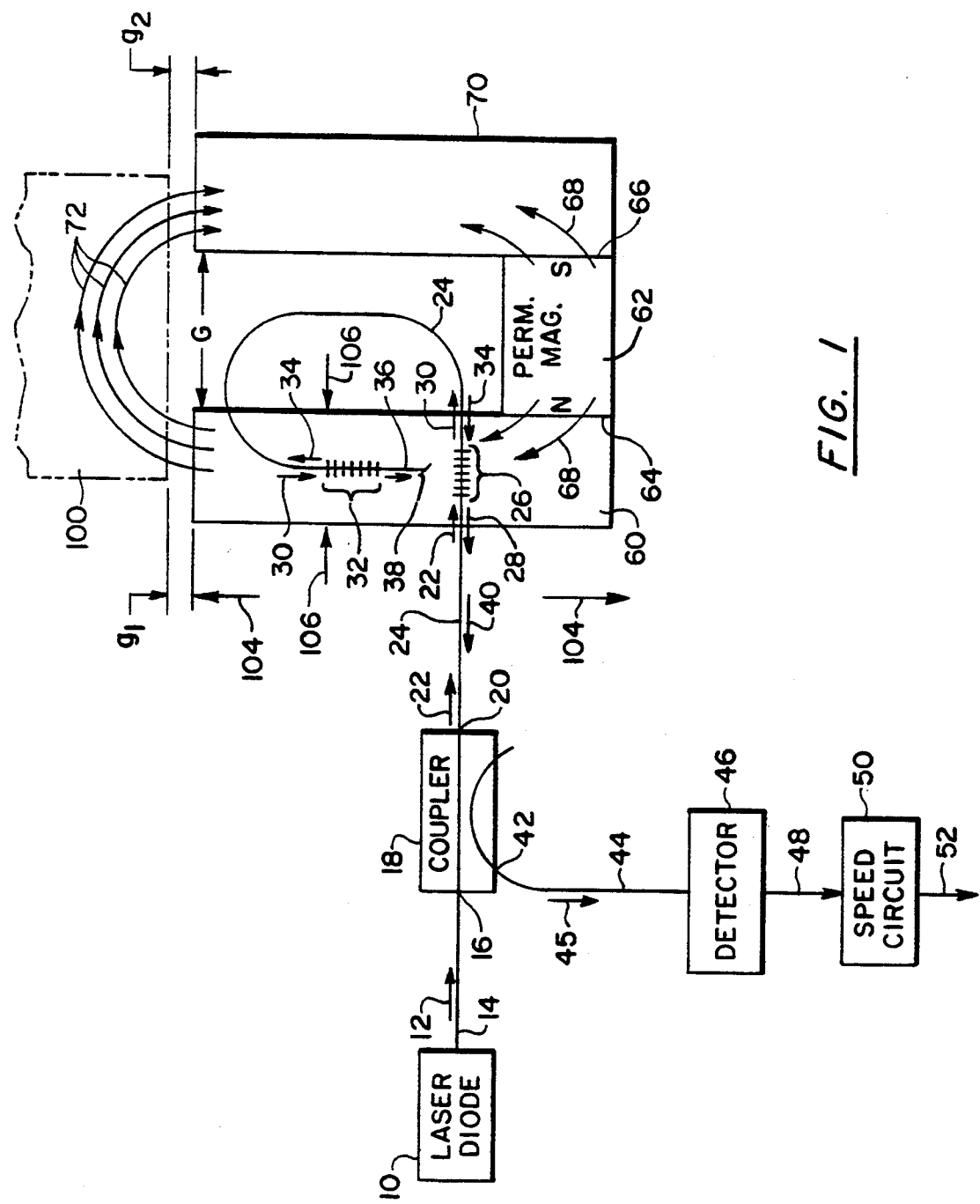
FIG. 1 is a schematic block diagram of a fiber optic sensor with Bragg gratings oriented perpendicular to each other on a single magnetostrictive pole piece in accordance with the present invention.

Referring now to FIG. 1, a laser diode 10, e.g., super luminescent or standard light emitting diode (LED), provides a broadband source light 12, onto an optical fiber 14. The optical fiber 14 is fed to a port 16, of a coupler 18. A predetermined percentage, e.g., 50%, of the light 16 exits the coupler 18 from a port 20 as the light 22. The light 22, travels along a fiber 24 and is incident on a Bragg grating 26 which is embedded in the core of the fiber 24.

The Bragg grating 26, as is known, reflects a predetermined narrow wavelength band of light 28 and passes the remaining wavelengths 30 along the fiber 24. The light 30 travels along the fiber 24 and is incident on a second Bragg grating 32, embedded in the core of the fiber 24, which reflects a predetermined narrow wavelength band of light 34, and passes the remaining wavelengths as a light 36. The fiber 24 has an end 38 which has an angled end face to minimize back reflections from the end face.

The reflected light 34 from the grating 32, and the reflected light 28 from the grating 26 propagate back toward the coupler 18, collectively indicated as a line 40. The light 40, enters the coupler 18 at the port 20 and a predetermined portion, e.g. 50%, of the light 40 is coupled to a port 42 of the coupler 18 and along a fiber 44 as light 45. The fiber 44 is fed to an optical detector 46 which provides an electrical output signal on a line 48 indicative of the optical power of the light 45 in the fiber 44 incident thereon.

The electrical signal on the line 48 is fed to a speed circuit 50 containing known electronic components (discussed hereinafter) capable of converting the ac signal 48 to a speed signal. The speed circuit 50 provides a digital or analog or square wave output signal, on a line 52 which is indicative of the rotational speed of a shaft to which gear teeth are attached.

The fiber 24 in the region of the Bragg gratings 26,32 are oriented substantially perpendicular to each other and are secured to e.g., by solder, epoxy, etc., or embedded within a magnetostrictive pole piece 60, e.g., metal amorphous glass (METGLASS® by Allied Signal), Terfenol-D ($Tb_{0.3}Dy_{0.7}Fe_{1.93}$), or Iron Cobalt. For a discussion of Terfenol-D, see the article: M. Moffett et al., "Characterization of Terfenol-D for magnetostrictive transducers," J. Acoustics Society Am., Vol. 89, No. 3, (March 1991). A magnetostrictive material, as is known, expands and retracts (or contracts) in response to changes in the strength of magnetic fields or flux therein. It is also known that when such expansion occurs in a magneto-strictive material, the volume is conserved; thus, an increase in length results in a decrease in the transverse cross-section. Other magnetostrictive materials may be used if desired.

Consequently, expansions and contractions of the pole piece 60 cause associated expansions and contractions of the gratings 26,32. Instead of being perpendicular to each other, the gratings 26,32 need only be oriented such that they do not experience the same stretching (and/or compression) along both gratings in precisely the same way. Consequently, the gratings should not be parallel to each other.

Adjacent to a side portion of the pole piece 60 is a rare-earth high-flux permanent magnet 62 made of, e.g., Aluminum Nickel Iron Cobalt (Alnicol), Neidynium Iron Boron, or Samarium Cobalt. The magnet 62 need not be high flux but having high flux improves device sensitivity. The magnet 62 has a north pole end 64 and a south pole end 66 and emits magnetic field lines 68. Adjacent to the south pole end 66 of the permanent magnet 62 is a pole piece 70, made of a material, e.g., metal, steel or laminated steel, which freely conducts magnetic fields. The pole piece 70 may or may not change shape in the presence of increased flux. The lateral cross-sectional shape of the pole pieces 60,62,70 may be circular, oval, rectangular square, or any other shape.

An air gap G, e.g., about 0.300 inches, exists between the pole piece 60 and the pole piece 70 and magnetic field lines 72 extend between the pole pieces 60,70 across the air gap G. Other air gaps may be used if desired. Because air has a high resistivity to magnetic fields, a relativity low flux level is exists in the pole pieces 60,70.

When a metallic tooth or blade 100, made of a magnetically conductive material, is placed between the two poles 60,70, the magnetic field lines 72 extend from the pole 60 through an air gap g1, e.g., 0.05 inches, to the tooth 100, which provides a low resistivity path for magnetic fields, and then from the tooth 100, across a gap g2, e.g., 0.05 inches, to the pole 70. Other spacings for the gaps g1,g2 may be used if desired, provided the tooth 100 is near enough to couple magnetic fields between the poles 60,70. The maximum allowable size of the gaps g1,g2 is determined by the strength of the permanent magnet, the gap G between the poles 60,70, and the sensitivity of the material 60. While the tooth 100 is nearby, the strength of the magnetic fields in the magnetic circuit made up of the pieces 60,62,100,70, is much greater (due to the presence of the tooth 100) than when the tooth 100 was not present (or nearby).

As a result of the increased magnetic flux in the pole piece 60, the pole piece 60 expands in the vertical length directions indicated by the arrow 104 (along the length of the magnetic field lines). Also, the pole piece 60 contracts in the horizontal transverse direction as indicated by the arrows 106. The stretching in the direction 104, causes the grating 32 to be stretched thereby causing a shift in the reflection wavelength of the Bragg grating 32 (discussed hereinbefore). Also, because the pole piece 60 contracts in the transverse direction 106, the Bragg grating 26 is compressed, thereby changing the reflection wavelength of the grating 26 in the opposite direction from that of the grating 32 (discussed hereinafter). It is not required that the material compress in the transverse direction 106.

Figure 2:
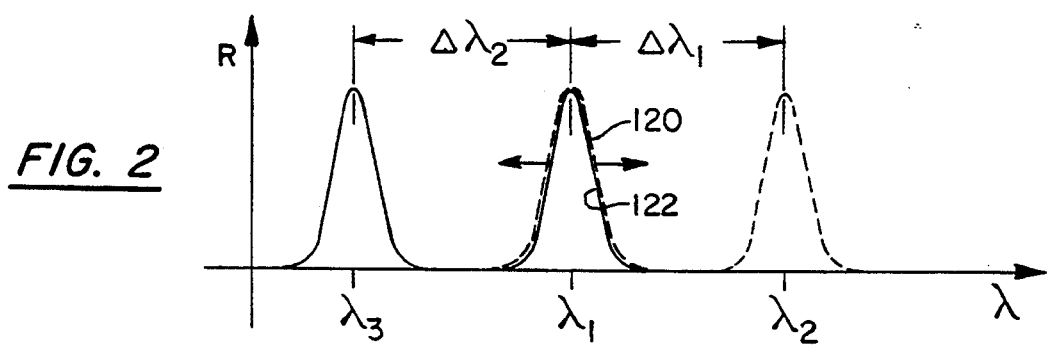
FIG. 2 is a graph of reflectivity versus wavelength for two Bragg gratings and the associated wavelength shift for each of the Bragg gratings in accordance with the present invention.

Referring now to FIG. 2, the reflectivity profile of the grating 32 is indicated by a dashed-line waveform 120 and the reflectivity profile for the grating 26 is indicated by a solid-line waveform 122. The gratings 26,32 are made substantially identically and thus have substantially the same reflection wavelengths and profiles. In the case when the tooth 100 is not present, both the gratings 26,32 overlap and both have a common central reflection wavelength $\lambda_1$. However, when the tooth 100 appears between the poles 60,70 (FIG. 1) the reflection wavelength of the grating 32 shifts to the right a predetermined amount $\Delta\lambda_1$ from $\lambda_1$ to $\lambda_2$, due primarily to a change in spatial periodicity and refractive index caused by the increase in length of the pole piece 60. Similarly, the reflection wavelength of the grating 26 shifts to the left an amount $\Delta\lambda_2$ to a new reflection wavelength $\lambda_3$ due to primarily a change in spatial periodicity caused by the transverse compression of the pole piece 60.

It should be understood that the pole piece 60 may be constrained from expanding toward the tooth 100 by fixing that edge to solid material, such as a casing. In that case, all length expansion would occur downwardly (away from the gear tooth 100).

Figure 3:
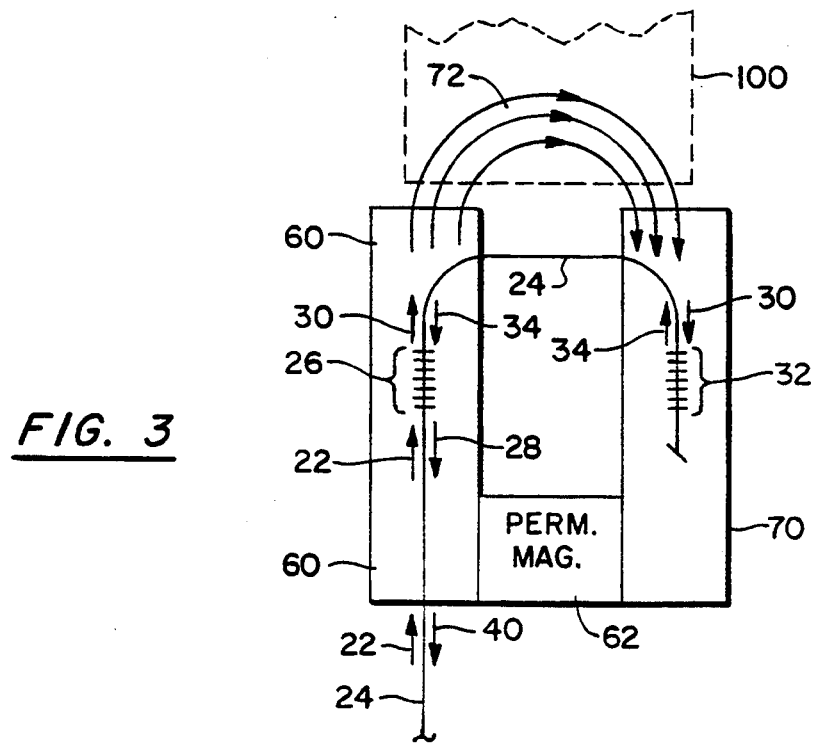
FIG. 3 is an alternative embodiment of the invention showing a Bragg grating in two different pole pieces, one being magnetostrictive and the other non-magnetostrictive, in accordance with the present invention.

Referring now to FIG. 3, in an alternative embodiment of the present invention, the grating 26 is oriented along the length of the magnetostrictive pole piece 60 similar to that of the grating 32 in FIG. 1. Also, the grating 32 is disposed on a non-magneto-strictive pole piece 70.

For the embodiment of FIG. 1, because the material 60 is isotropic, it expands and contracts the same amount in both the vertical direction 104 and the horizontal direction 106 due to changes in temperature. Thus, the thermal changes in periodic spacing of the gratings 26,32 track each other, causing the common central wavelength $\lambda_1$ (FIG. 2) for both gratings 26,30 to shift together, thereby automatically compensating for any temperature variation in the sensor. For the embodiment of FIG. 3, however, to provide automatic temperature compensation, the pole pieces 60,70 should have substantially the same thermal expansion coefficients.

Figure 4:
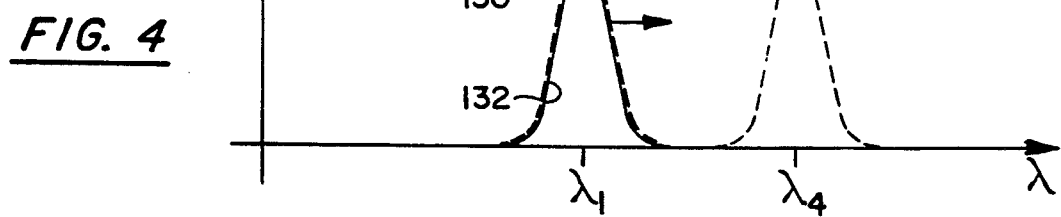
FIG. 4 is a graph of reflectivity versus wavelength for two Bragg gratings and the associated wavelength shift for one of the Bragg gratings in accordance with the present invention.

Referring now to FIGS. 3 and 4, when the tooth 100 is between the poles 60,70, the flux 72 causes the pole piece 60 to increase in length, thereby stretching the grating 26. When the grating 26 is not stretched, i.e., when the tooth 100 is not present, the gratings 26,32 have reflectivity profiles 130,132, respectively, having a common central reflection wavelength $\lambda_1$ similar to that in the embodiment discussed hereinbefore with FIG. 1. However, when the tooth 100 is between the poles 60,70 the grating 26 is stretched, as discussed hereinbefore, due to the magnetostrictive characteristics of the pole piece 60. This stretching causes the reflection wavelength to shift to the right by an amount $\Delta\lambda_3$ to a new reflection wavelength $\lambda_4$. However, because the grating 32 is on the pole 70, which is non-magnetostrictive, it does not change shape due the presence of the increased flux 72 caused by the presence of the tooth 100. Thus, the reflectivity profile 132 of the grating 32 does not change due to the presence of the tooth 100.

In either the embodiment of FIG. 1 or the embodiment of FIG. 3, where the reflection wavelength shifts as indicated in FIGS. 2,4, respectively, the overall effect is the same for the collective output light 40 and for the light 45 from the coupler 18. In particular, when the reflectivity profiles of the two gratings 26,32 have a single common reflection wavelength, i.e., when the tooth 100 is not present, the light 28 reflected from the grating 26 comprised primarily the wavelength $\lambda_1$. Thus, the light 30 that passes through the grating 26 does not have this wavelength component (or has a very small power level of it). As a result, the reflected light 34 from the grating 32 will be a very low level signal. Furthermore, any signal level that does exist will be reflected by the grating 26, thereby precluding it from combining with the light 28. Consequentially, the collective light 40 entering the coupler 18 is primarily comprised of the reflected light 28.

However, when the tooth 100 is between the poles 60,70, the shift in reflectivity wavelength of the grating 32 (for the embodiment of FIG. 1) or the grating 26 (for the embodiment of FIG. 3), the wavelength shifts such that the two gratings 26,32 no longer have the same reflection wavelength (i.e., the grating 32 reflects a wavelength different from that of the grating 26). Thus, the collective reflected light 40, (comprised of a combination of the reflected light 34 and the reflected light 28 from the grating 32,26, respectively) will have an overall increased power in this condition. Consequently, the light 45 incident on detector 46 will have a greater power level and thus the output signal of the detector 46 on the line 48 will indicate a higher signal level.

Referring to FIG. 5, if the teeth are evenly spaced and have a common width, the electrical signal produced by the optical detector 46 (FIG. 1) will be similar to a sine wave 200. The speed circuit 50 comprises a known AC amplifier 202 which is responsive to the AC signal 200 on the line 48 from the optical detector 46. The amplifier 202 provides an amplified electrical signal on a line 204 as indicated by a waveform 206. The amplified signal is passed to a known high pass filter 208, which provides an AC-coupled signal on a line 210 as indicated by a waveform 212 to a known zero-crossing detector 214. The zero-crossing detector 214, detects the points at which waveform crosses 0 volts and produces a high DC output voltage for input voltages above 0 volts in a low output voltage for input voltages below 0 volts on a line 215 as indicated by the waveform 216. The square wave signal 216 on the line 215 may then be fed to a counter or a microprocessor 218 which counts the number of pulses and averages the number of pulses over a predetermined time period to determine the speed of the shaft which the rotating gears are attached to.

Numerous other signal processing techniques may be used to convert the signal from the detector 46 to a speed signal on the line 52. Also, the output from the speed circuit may be a digital signal or an analog signal, depending on the desired application. It should be understood that the type of speed circuit used is not critical to the invention.

Figure 6A:
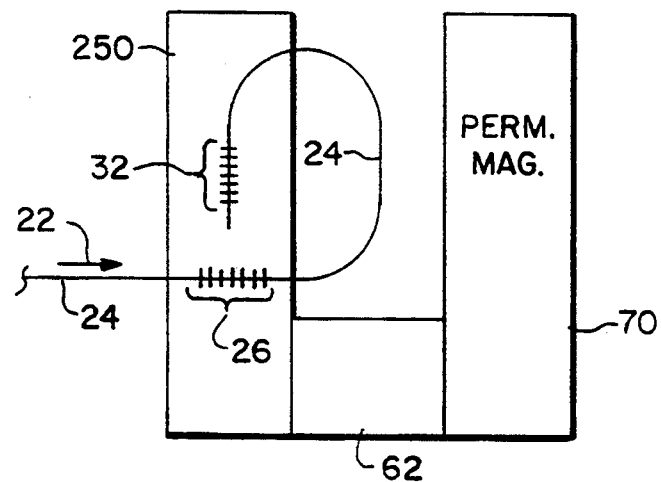
FIG. 6 is a drawing of alternative embodiments of the present invention showing three alternative placements for a permanent magnet in illustrations (a), (b), (c), in accordance with the present invention.
Figure 6B:
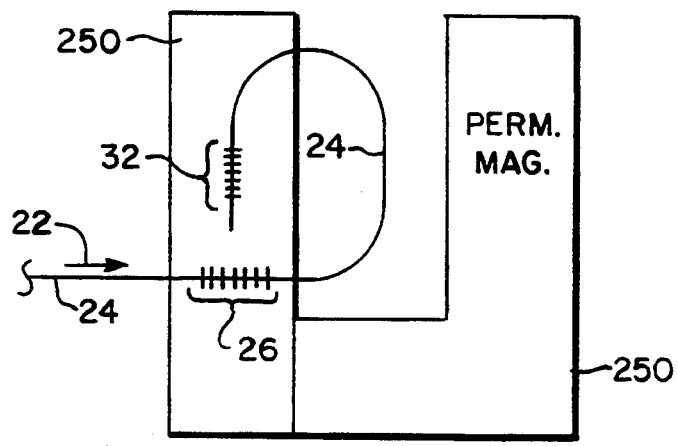
Figure 6C:
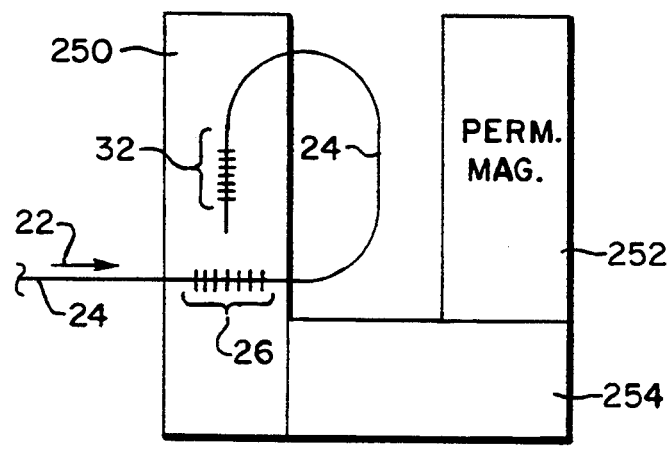

Referring now to FIG. 6, illust. (a), an alternative environment of the technique of FIG. 1 has the pole piece 70 being a permanent magnet. In illust. (b), the pole piece 70 and the piece 62 (FIG. 1) have been replaced by a permanent magnet in an "L" shaped section 250. In FIG. 6, illust. (c), the pole piece 70 and the piece 62 (FIG. 1) have been replaced by a non-magnetostrictive pole piece 254 and a permanent magnet 252 attach to the piece 254 at its end face.

It should be understood that other configurations of the embodiment of FIG. 1 may be devised provided there exists a permanent magnet and a section of magnetostrictive material having non-parallel gratings.

Figure 7:
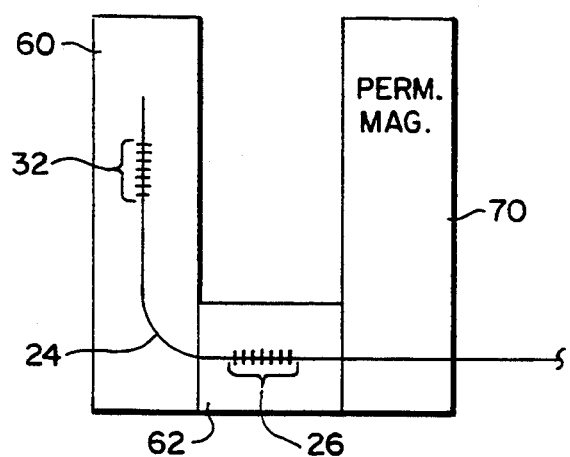
FIG. 7 is an alternative embodiment showing an alternative placement for two Bragg grating and a permanent magnet in accordance with the present invention.

Referring now to FIG. 7, an alternative embodiment to that of FIG. 3 has the pole piece 70 being a permanent magnet and the connecting piece 62 being the non-magnetostrictive material with one grating 26 attached thereto and the pole piece 60 being the magnetostrictive material discussed hereinbefore. In that case, the thermal expansion coefficient of the parts 60,62 should be substantially the same. In the embodiments of FIGS. 6 and 7, the permanent magnet is longer than that shown in FIGS. 1 and 3 thereby allowing greater magnetic field strength to exist, thereby making the system more sensitive to nearby metal material.

It should be understood that other configurations of the embodiment of FIG. 3 may be devised provided there exists a permanent magnet and one grating mounted to a section of magnetostrictive material and another grating mounted to a non-magnetostrictive material, and both having the same thermal expansion coefficients.

Figure 8:
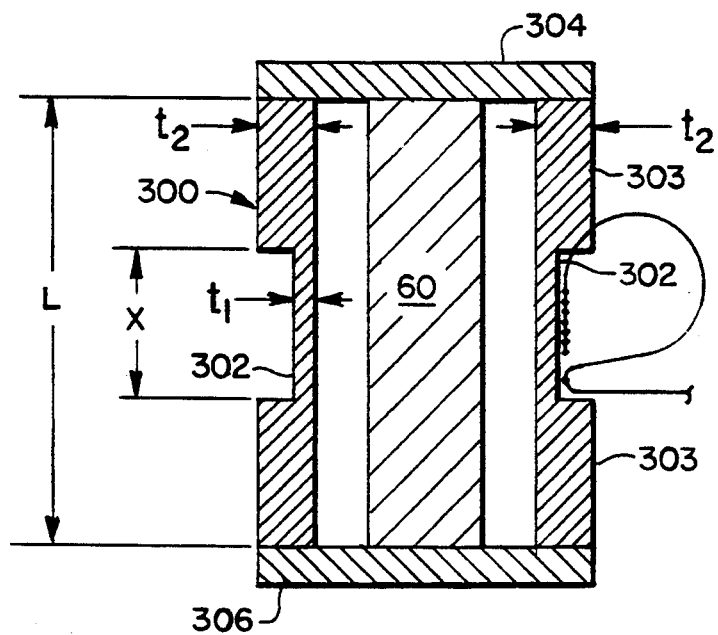
FIG. 8 is a side, cross-section view of a mechanical strain amplifier in accordance with the present invention.
Figure 9:
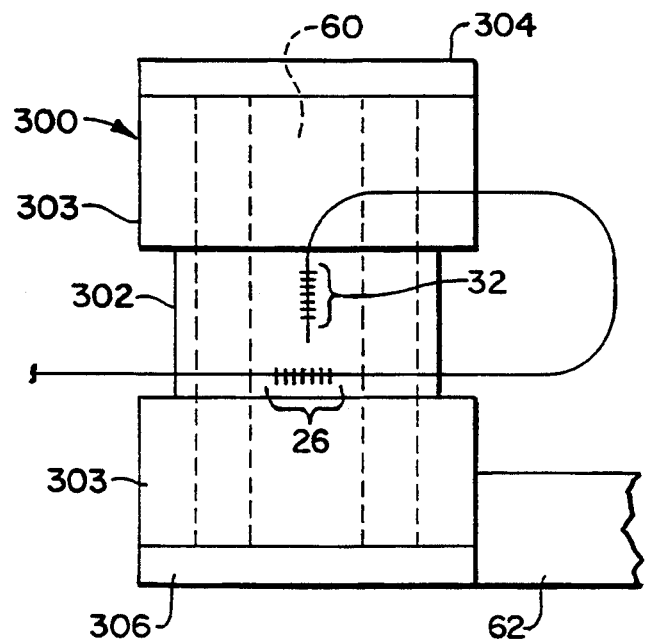
FIG. 9 is a right side view of the mechanical strain amplifier of FIG. 8 in accordance with the present invention.

Referring now to FIGS. 8 and 9, a sheath 300 is provided around the magnetostrictive pole piece 60. The sheath 300 has a notched section 302 which has a thickness $t_1$ which is less than the thickness $t_2$ of other portions 303 of the sheath 300. Upper and lower caps 304,306, e.g., made of metal or any rigid material capable of conducting magnetic fields, are disposed on both the pole piece 60 and the sheath 300.

As the magnetostrictive material of the pole 60 expands due to presence of the tooth 100 (FIG. 1), the notched region 302 will stretch proportionately more than the thicker portion 303 of the sheath 300.

For example, if the magnetostrictive pole 60 expands by 0.002 inches over its entire length L of 2 inches and if the fiber were mounted to the pole 60, the sensitivity would be $\Delta L/L$ or $0.002/2=0.001$. However, for the same expansion of the pole 60, if the sheath 300 is used having the notch 302 which has a length x of 0.5 inches. In that case, the section 303 outside the notch 302 of the sheath 300 does not stretch appreciably and the entire stretching action of the pole 60 will occur over the shorter notch length x of 0.5 inches, thereby creating a length sensitivity change of $\Delta L/x=0.002/0.5=0.004$. This illustrates a four-fold increase in expansion of the grating 32, thereby increasing the amount of wavelength shift for a given amount of magnetic field strength and increasing the mechanical sensitivity of the device.

Also, the mechanical strain amplifier of FIGS. 8 and 9 will work equally well if a single grating is placed on the sheath 300 as in the technique of FIG. 3. Further, instead of having a notch in the sheath 300, the regions 203,303 of the sheath 300 may be the same thickness but have reinforcing filaments in the regions 303, or be made of a more rigid material than that in the regions 302, thereby making the regions 303 more rigid than the region 302 where the fiber is mounted. Also, the sheath 300 may instead be a bar that is mounted parallel to the pole 60.

It suffices for the present invention that at least one of the fiber gratings be mechanically connected to the magnetorestrictive pole piece, either by being disposed directly thereon (or therein), or beind disposed on a mechanincal strain amplifier which is connected to the magnetostrictive material.

Although the invention has been described as a speed sensor, it should be understood that the embodiments of the invention may be used to detect any metal object that comes between the poles 60,70.

Also, it should be understood that in FIGS. 8 and 9, the sheath 300 should be made of a material that is non-magnetostrictive and furthermore does not conduct magnetic fields, such as brass, to prevent the reduction of magnetic field strength through the magnetostrictive material 60.

Figure 10:
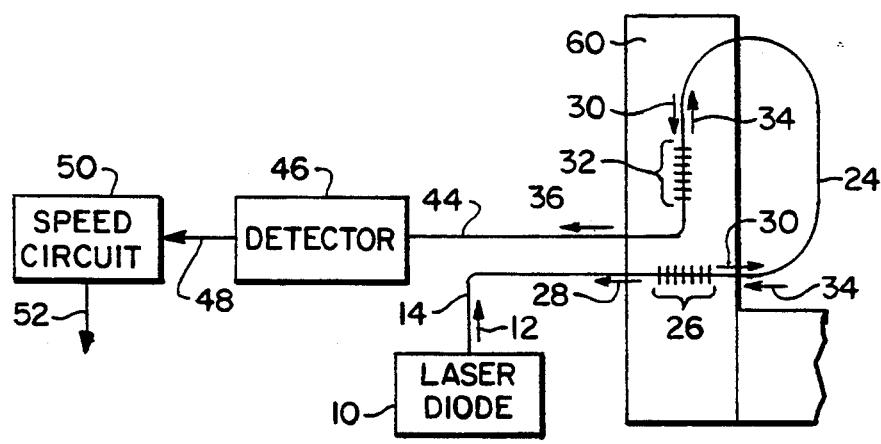
FIG. 10 is a schematic block diagram of an alternative embodiment of the invention showing Bragg gratings used in transmission mode, in accordance with the present invention.
Figure 11:
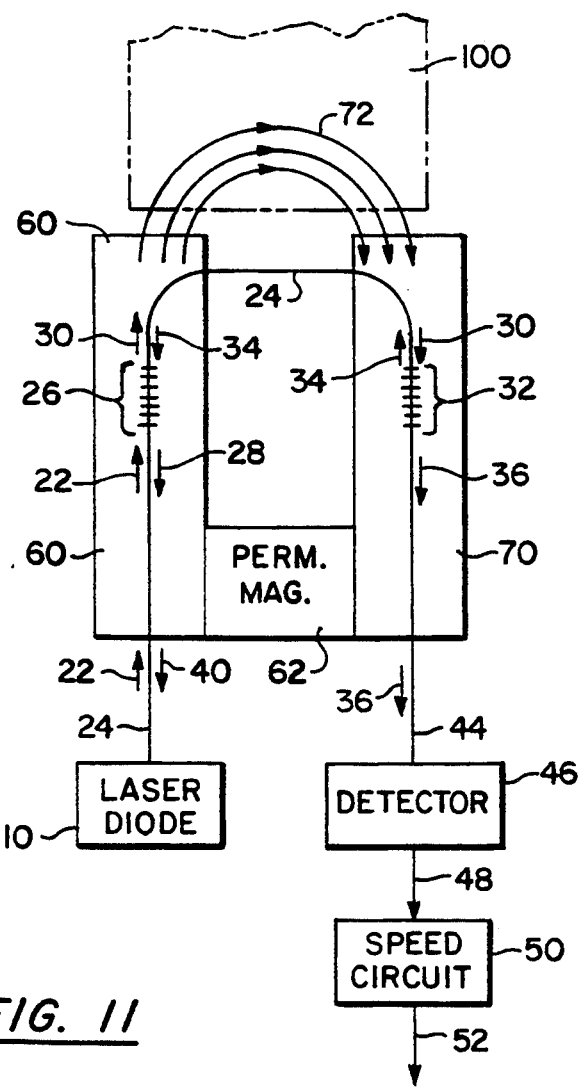
FIG. 11 is a schematic block diagram of an alternative embodiment of the present invention showing Bragg gratings used in transmission mode, in accordance with the present invention.

Referring now to FIGS. 10 and 11, although the invention has been described as being used in reflection, the invention may instead be used in transmission mode. In that case, the coupler 18 would not be needed, the fiber 44 would be connected to the end 38 (FIG. 1) of the fiber 24, and the detector 46 would receive the light 36 from the grating 32. Also, the fibers 24,44 would likely be one continuous fiber. The intensity profile for a grating in transmission mode is a high signal level at all wavelengths except at the reflection wavelength. Also, instead of detecting an increase in optical power when the tooth 100 is between the poles 60,70, a decrease in power will occur at that time. Because such a technique would remove the coupler 18, there would be less optical power loss in the system, thereby allowing a stronger feedback signal. However, such an embodiment would require two fibers to be fed to the device. Also, to provide sufficient decrease in power to be detected by the detector, the profile of the grating should be as broad band as possible.

Figure 12:
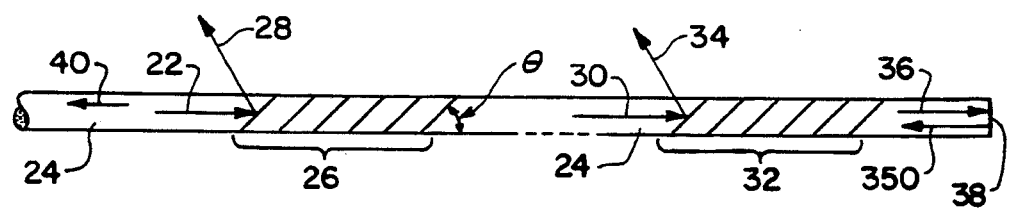
FIG. 12 is a side view of an optical fiber with Bragg gratings oriented at an angle other than 90° from the direction of propagating light, in accordance with the present invention.

Referring now to FIG. 12, an alternative way to detect the reflection wavelength separation of the two gratings in transmission mode using a single fiber is to write the gratings at an angle $\theta$. This causes the incident light beams 22,30 onto the gratings 26,32, respectively, to be reflected out of the fiber. Additionally, the end face 38 of the fiber 24 should be cut perpendicular and polished or coated with a reflective coating such as aluminum or gold, to provide substantially total internal reflection light 350. The light then passes through both gratings 32,26 a second time, further filtering out the reflection wavelength. In that case, the total return light 40 will be the transmission light, similar to that of FIGS. 10,11. However, the attenuation at the reflection wavelength will be greater because of the two passes through the gratings 26,32.

Further, instead of having the gratings embedded in the same fiber 24 (FIG. 1), they may be embedded in a different fiber and spliced into the fiber 24. Also, instead of Bragg gratings, any reflective element that has a predetermined reflection wavelength and that exhibits a shift in such reflection wavelength with strain on the pole piece may be used if desired. Still further, instead of an optical fiber, any optical waveguide may be used to propagate source light to, and reflected light from, the reflective elements.

Also, it should be understood that the invention will work equally well with the first or the second grating in the string being the grating that is stretched by the magnetostrictive material.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. An optical sensor, comprising:
   a magnetostrictive material which expands and contracts based on the strength of magnetic fields therein;
   magnetic field means connected to a portion of said magnetostrictive material, for providing said magnetic fields within said magnetostrictive material;
   an optical waveguide that guides light;
   first reflection means, disposed along said waveguide in the path of a source light, for providing a first reflected light having a first reflection wavelength, and for providing a first transmitted light;
   second reflection means, disposed along said waveguide in the path of said first transmitted light from said first reflection means, for providing a second reflected light at a second reflection wavelength and for providing a second transmitted light;
   light from said first and said second reflection means making up an output light signal;
   said first and said second reflection means being mechanically connected to said magnetostrictive material and being oriented non-parallel to each other;
   said magnetostrictive material and said magnetic field means being oriented so as to cause the strength of the magnetic field in said magnetostrictive material to increase while a metallic object is nearby, thereby causing a dimension of said magnetostrictive material to increase and causing one of said reflection means to be stretched; and
   said first and said second reflection wavelength being substantially equal to each other while said metallic object is not nearby and being unequal while said metallic object is nearby, thereby causing the magnitude of said output light signal to change while said metallic object is nearby.

2. The optical sensor of claim 1 wherein said first and said second reflection wavelengths change in substantially the same way due to temperature variations of said magnetostrictive material.

3. The optical sensor of claim 1 wherein said first and said second reflection means are disposed on said magnetostrictive material.

4. The optical sensor of claim 1 wherein said first and said second reflection means are disposed on a mechanical amplifier which is mechanically connected to said magnetostrictive material.

5. The optical sensor of claim 1 wherein said first and said second reflection means are oriented substantially perpendicular to each other.

6. The optical sensor of claim 1 wherein said first and said second reflection means are oriented on said magnetostrictive material such that one of said reflection means is stretched and the other is compressed while said metallic object is nearby.

7. The optical sensor of claim 1 further comprising detection means for detecting said output signal, and for providing an electrical detection signal indicative of the optical power incident on said detection means.

8. The optical sensor of claim 7 further comprising speed detection means, responsive to said detection signal, for providing a signal indicative of the rotational speed of said metallic object.

9. The optical sensor of claim 1 wherein said first and said second reflection means comprise Bragg gratings.

10. The optical sensor of claim 1 wherein said optical waveguide is an optical fiber.

11. The optical sensor of claim 1 wherein said magnetic field means comprises a permanent magnet.

12. The optical sensor of claim 1 wherein said output light comprises said first and said second reflected light.

13. The optical sensor of claim 1 wherein said output light comprises said first and said second transmitted light.

14. The optical sensor of claim 1 wherein said output light comprises said first and said second transmitted light, said first and said second reflection means are not normal to said source light, and an end of said waveguide is reflective.

15. The optical sensor of claim 1 wherein said change in the magnitude of said output light comprises an increase in magnitude.

16. An optical sensor, comprising:

a magnetostrictive material which expands and contracts based on the strength of magnetic fields therein;

magnetic field means connected to a portion of said magnetostrictive material, for providing said magnetic fields within said magnetostrictive material;

a non-magnetostrictive material connected to a portion of said magnetic field means;

an optical waveguide that guides light;

first reflection means, disposed along said waveguide in the path of a source light, for providing a first reflected light at a first reflection wavelength, and for providing a first transmitted light;

second reflection means, disposed along said waveguide in the path of said first transmitted light from said first reflection means, for providing a second reflected light at a second reflection wavelength and for providing a second transmitted light;

light from said first and said second reflection means making up an output light signal;

one of said reflection means being mechanically connected to said magnetostrictive material and the other of said reflection means being mechanically connected to said non-magnetostrictive material;

said magnetostrictive material and said magnetic field means being oriented so as to cause the strength of the magnetic field in said magnetostrictive material to increase while a metallic object is nearby, thereby causing a dimension of said magnetostrictive material to increase and causing said reflection means mechanically connected thereto to be stretched; and said first and said second reflection wavelength being substantially equal to each other while said metallic object is not nearby and being unequal when said metallic object is nearby, thereby causing the magnitude of said output light signal to change while said metallic object is nearby.

17. The optical sensor of claim 16 wherein said first and said second reflection wavelengths change in substantially the same way due to temperature variations of said magneto strictive material and said non-magnetostrictive material.

18. The optical sensor of claim 16 wherein one of said reflection means is disposed on said magnetostrictive material and the other of said reflection means is disposed on said non-magnetostrictive material.

19. The optical sensor of claim 16 wherein at least one of said reflection means is disposed on a mechanical amplifier which is mechanically connected to said magnetostrictive material.

20. The optical sensor of claim 16 further comprising detection means for detecting said output signal, and for providing an electrical detection signal indicative of the optical power incident on said detection means.

21. The optical sensor of claim 20 further comprising speed detection means, responsive to said detection signal, for providing a signal indicative of the rotational speed of said metallic object.

22. The optical sensor of claim 16 wherein said first and said second reflection means comprise Bragg gratings.

23. The optical sensor of claim 16 wherein said optical waveguide is an optical fiber.

24. The optical sensor of claim 16 wherein said magnetic field means comprises a permanent magnet.

25. The optical sensor of claim 16 wherein said output light comprises said first and said second reflected light.

26. The optical sensor of claim 16 wherein said output light comprises said first and said second transmitted light.

27. The optical sensor of claim 16 wherein said output light comprises said first and said second transmitted light and said first and said second reflection means are not normal to said source light, and an end of said waveguide is reflective.

28. The optical sensor of claim 16 wherein said change in the magnitude of said output light comprises an increase in magnitude.

* * * * *